(12) United States Patent
Stillig

(10) Patent No.: US 11,333,493 B2
(45) Date of Patent: May 17, 2022

(54) OVERLOAD RECOGNITION SYSTEM FOR A CHASSIS COMPONENT

(71) Applicant: ZF Friedrichshafen AG, Friedrichshafen (DE)

(72) Inventor: Carsten Stillig, Stemwede (DE)

(73) Assignee: ZF Friedrichshafen AG, Friedrichshafen (DE)

(*) Notice: Subject to any disclaimer, the term of this patent is extended or adjusted under 35 U.S.C. 154(b) by 82 days.

(21) Appl. No.: 16/482,899

(22) PCT Filed: Feb. 19, 2018

(86) PCT No.: PCT/EP2018/053964
§ 371 (c)(1),
(2) Date: Aug. 1, 2019

(87) PCT Pub. No.: WO2018/171992
PCT Pub. Date: Sep. 27, 2018

(65) Prior Publication Data
US 2020/0011663 A1    Jan. 9, 2020

(30) Foreign Application Priority Data
Mar. 21, 2017 (DE) ...................... 10 2017 204 729.1

(51) Int. Cl.
*G01B 21/32* (2006.01)
(52) U.S. Cl.
CPC .................... *G01B 21/32* (2013.01)
(58) Field of Classification Search
CPC .................................................. G01B 21/32
See application file for complete search history.

(56) References Cited

U.S. PATENT DOCUMENTS

| 5,431,050 A * | 7/1995 | Yamada | G01P 15/0802 |
| | | | 73/514.32 |
| 5,585,572 A | 12/1996 | Kindler | |
| 5,753,828 A | 5/1998 | Madni et al. | |
| 5,933,002 A * | 8/1999 | Jacobsen | B23K 15/002 |
| | | | 324/99 R |
| 2003/0062215 A1 * | 4/2003 | Yasuda | G01L 3/104 |
| | | | 180/444 |
| 2010/0134782 A1 * | 6/2010 | Roberts | E21B 17/015 |
| | | | 356/32 |

(Continued)

FOREIGN PATENT DOCUMENTS

DE    10 2005 027 251 A1    12/2006
DE    10 2009 032 991 A1    12/2010
(Continued)

OTHER PUBLICATIONS

German Office Action Corresponding to 10 2017 204 729.1 dated Nov. 17, 2017.

(Continued)

*Primary Examiner* — Eric S. McCall
(74) *Attorney, Agent, or Firm* — Finch & Maloney PLLC; Michael J. Bujold; Jay S. Franklin

(57) ABSTRACT

An overload recognition system for a bar-type chassis component, having a sensor system which detects a nominal condition parameter of the chassis component. The sensor system is designed as a deformation detecting sensor system for an individual chassis component.

13 Claims, 3 Drawing Sheets

(56) References Cited

U.S. PATENT DOCUMENTS

2013/0298726 A1 11/2013 Diekhoff et al.
2015/0006054 A1* 1/2015 Hofmann ................ G01L 1/127
                                                                             701/71
2015/0166101 A1 6/2015 Ross

FOREIGN PATENT DOCUMENTS

| DE | 10 2010 031 064 A1 | 1/2012 |
| --- | --- | --- |
| DE | 10 2010 043 778 A1 | 5/2012 |
| DE | 10 2012 107 391 A1 | 2/2014 |
| DE | 10 2013 018 526 A1 | 5/2015 |
| EP | 2 218 629 A2 | 8/2010 |

OTHER PUBLICATIONS

International Search Report Corresponding to PCT/EP2018/053964 dated Apr. 10, 2018.
Written Opinion Corresponding to PCT/EP2018/053964 dated Apr. 10, 2018.

* cited by examiner

Fig. 2
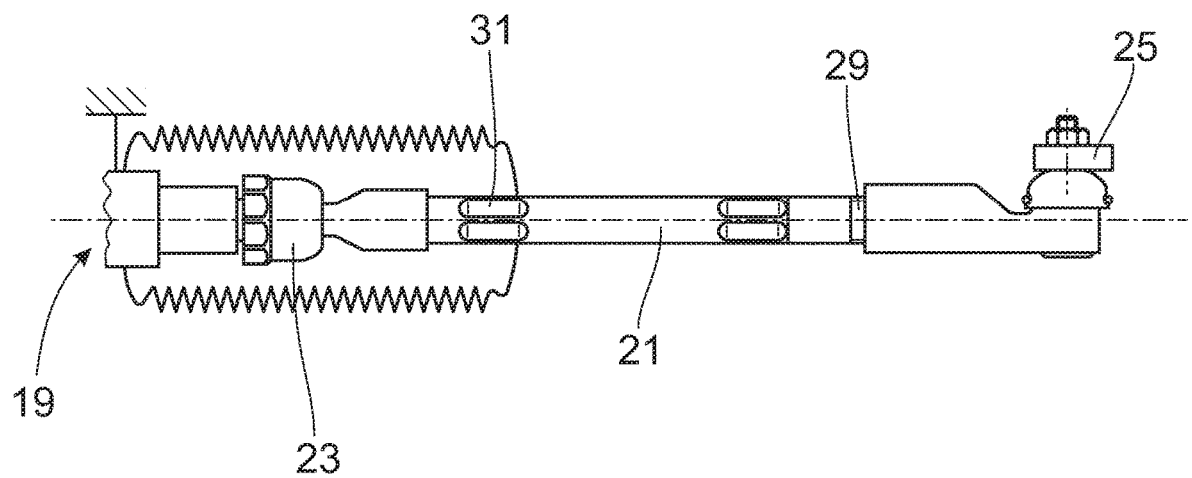
PRIOR ART
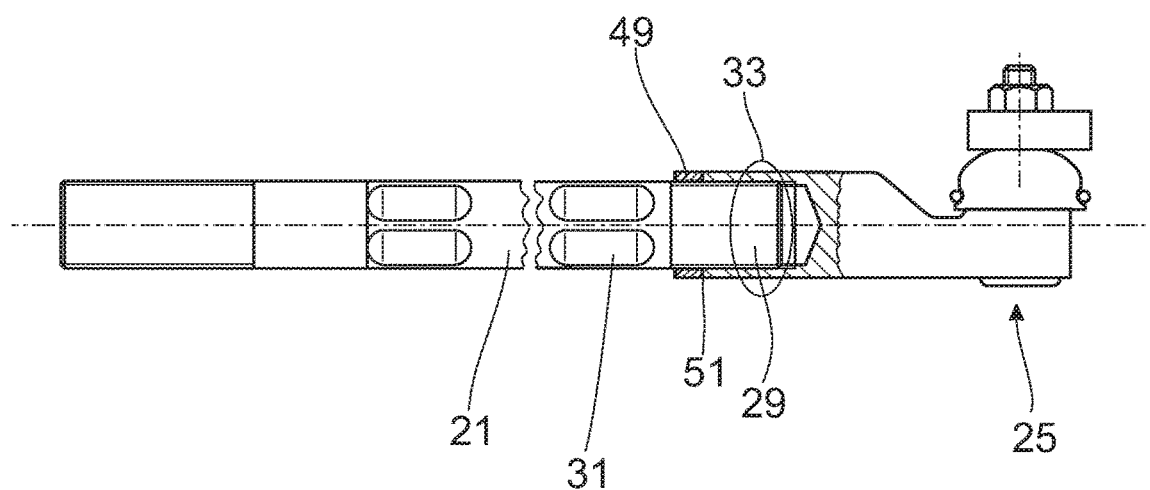
Fig. 3
PRIOR ART

OVERLOAD RECOGNITION SYSTEM FOR A CHASSIS COMPONENT

This application is a National Stage completion of PCT/EP2018/053964 filed Feb. 19, 2018, which claims priority from German patent application serial no. 10 2017 204 729.1 filed Mar. 21, 2017.

FIELD OF THE INVENTION

The invention relates to overload recognition.

BACKGROUND OF THE INVENTION

Modern motor vehicles, especially passenger cars, are increasingly equipped with assistance systems which on the one hand make life easier for the driver, but on the other hand allow less and less feedback about the chassis to the driver. As a result the driver may not be made aware of a defect, such as a bent track-rod or a deformed transverse control arm. From corresponding tests, however, it is known that the residual service life after a plastic deformation of chassis components is sometimes considerably reduced. Thus it could happed that due to the compensating effect of the assistance system prior damage to the track-rod, for example as a result of driving over an obstacle, is not noticed by the driver and later for that reason leads to fracture and to an accident.

Thus, DE 10 2010 043 778 A1 describes a steering element with a mechanical overload protection system which, when it acts, results in a clearly perceptible play of the steering, but which, as already said, would be compensated by an assistance system and would therefore not be noticeable by the driver.

DE 10 2013 018 526 A1 relates to a system for detecting a change of an axle adjustment of a motor vehicle. For this, the system comprises a force-measuring unit or an angle-measuring unit, which sends a signal to an evaluation device. The evaluation device compares the signal at the time with a reference signal, and if the reference signal is exceeded this is interpreted as an overloading of the vehicle axle.

The evaluation of a force signal is often prone to a larger element of vagueness since a force above the calculated load limits does not necessarily also result in damage. Consequently a repair is carried out, which in itself would not be necessary.

Angle measurement is likewise not a clear measurement parameter, since in the event of an overload the theoretical case may arise that although two control arms in the axle have been bent, the angle between the two control arms remains within the tolerance range since the respective deformations, as it were, compensate one another. Then both control arms would have to be replaced, but the system would not detect that situation.

SUMMARY OF THE INVENTION

The purpose of the present invention is to provide an overload recognition system which overcomes the problems known from the prior art.

This objective is achieved by designing the sensor system as a deformation detection sensor for an individual chassis component.

In contrast to the prior art, the deformation of the chassis component is detected as the reference variable. Thus, compared with the prior art a value is used which would allow a defect to be recognized directly, which defect also leads to a change of the chassis geometry or even to damage. Furthermore, the load is determined on a single component. No compensation effect can take place within the chassis.

In a further advantageous embodiment of the invention, the sensor system comprises a plurality of individual sensors. On the one hand this makes for a certain redundancy and measurement errors can be recognized.

With regard to determining the deformation direction, the individual sensors are arranged in different planes relative to one another.

To produce a sensor system which is particularly simple to handle, the individual sensors form a cage. The cage only has a low design strength and does not therefore reduce the quality of the measurement signal.

For this it is further provided that the cage is held on one side in the longitudinal direction of the chassis component. Axial stresses could also falsify the measurement signal.

To fix the sensor system, the cage has an annular attachment section. The sensors themselves are not loaded in connection with the attachment function.

According to an advantageous sub-claim, the attachment section is fixed by way of a fastener of the chassis component. The cage can for example consist of a plastic material which is tightened by a screw cap.

For this, the attachment section is made radially elastic, for example in that it has slot-shaped cutouts.

In a further design the chassis component is made in two parts which form between them a parting line where the attachment section is arranged. Consequently no additional fastener are needed for the sensor system.

It can also be provided that the attachment section and the fastener are permanently connected to one another. This considerably simplifies handling during the assembly process.

In order to be able to detect even the slightest deformations, the sensor is arranged at least in the vicinity of the region of the chassis component with the lowest structural strength.

BRIEF DESCRIPTION OF THE DRAWINGS

The invention will be explained in more detail with reference to the following description of the figures.

FIG. 2: A track-rod with bearings, as an assembly
FIG. 3: A track-rod as in FIG. 2, with only an axial bearing

DETAILED DESCRIPTION OF THE PREFERRED EMBODIMENTS

Figure 1:
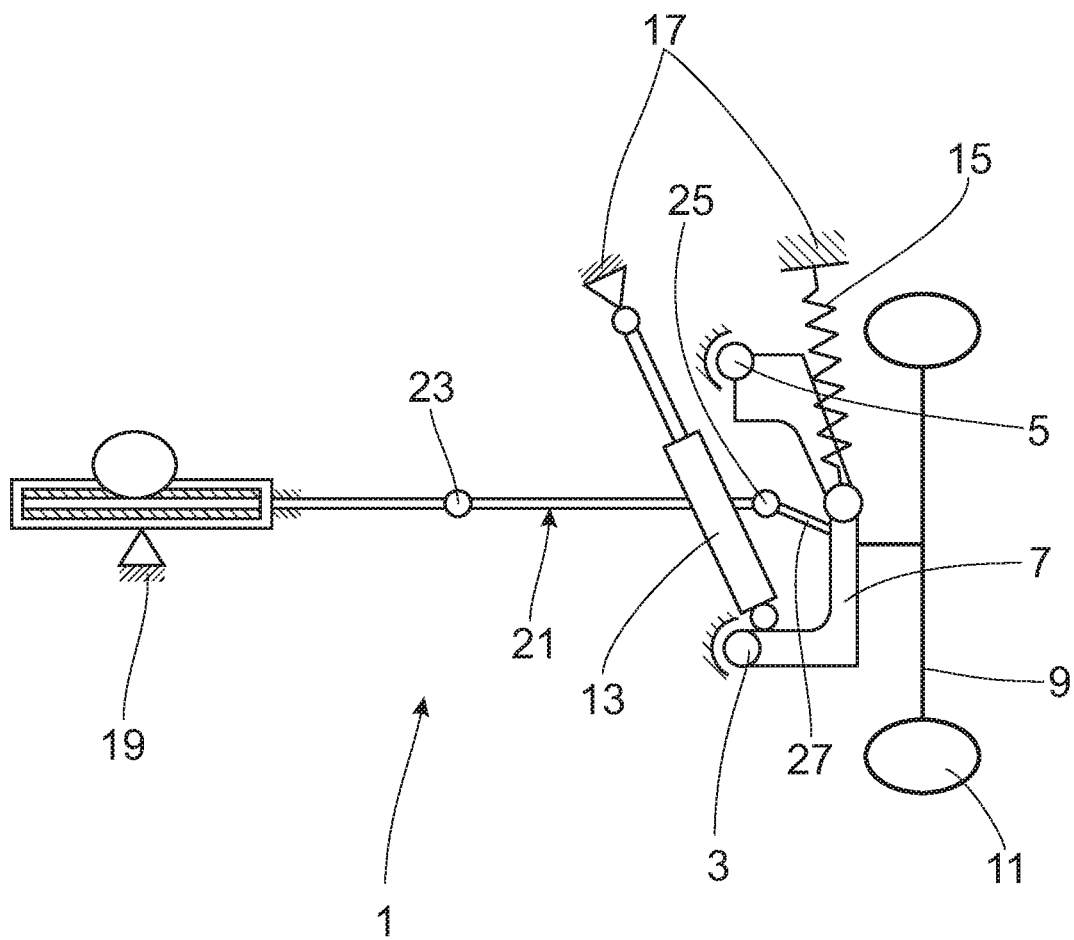
FIG. 1: Exemplary schematic representation of a chassis

A chassis 1 shown as an example in FIG. 1 for a side of a vehicle comprises a transverse control arm 7 fixed to the body by means of joints 3; 5, on which a wheel carrier 9 for a wheel 11 is arranged. By way of a vibration damper 13 and a vehicle supporting spring 15 illustrated only in principle, a vehicle body 17 is supported on the chassis 1.

The chassis 1 is designed to be steerable and comprises a steering device 19 illustrated only schematically, with a chassis component 21 connected thereto. In this example embodiment the chassis component 21 is a track-rod 21 with a bearing 23; 25 at each end. Between the track-rod 21 and the wheel carrier 9 is arranged a steering lever 27 by means of which axial movement of the track-rod 21 is converted into a pivoting movement of the wheel carrier 9 and the wheel 11. Basically however, the invention could also be used with a chassis that cannot be steered.

FIG. 2 shows the track-rod 21 of FIG. 1 in a corresponding fitted condition. The track-rod 21 is divided into two parts and comprises a threaded shaft 29 for adjusting its length (see FIG. 3) in order to set a defined angle between the track-rod 21 and the angled steering lever 27. The track-rod 21 has at least one key surface 31 for rotating the track-rod when a screw connection 33 to the steering device 19 is formed.

When an overload of the chassis 1 occurs, the track-rod 21 tends to be a more sensitive component, because if it is deformed, this has a direct influence on the steering behavior but also on the ability of the vehicle to travel in a straight line.

Figure 4:
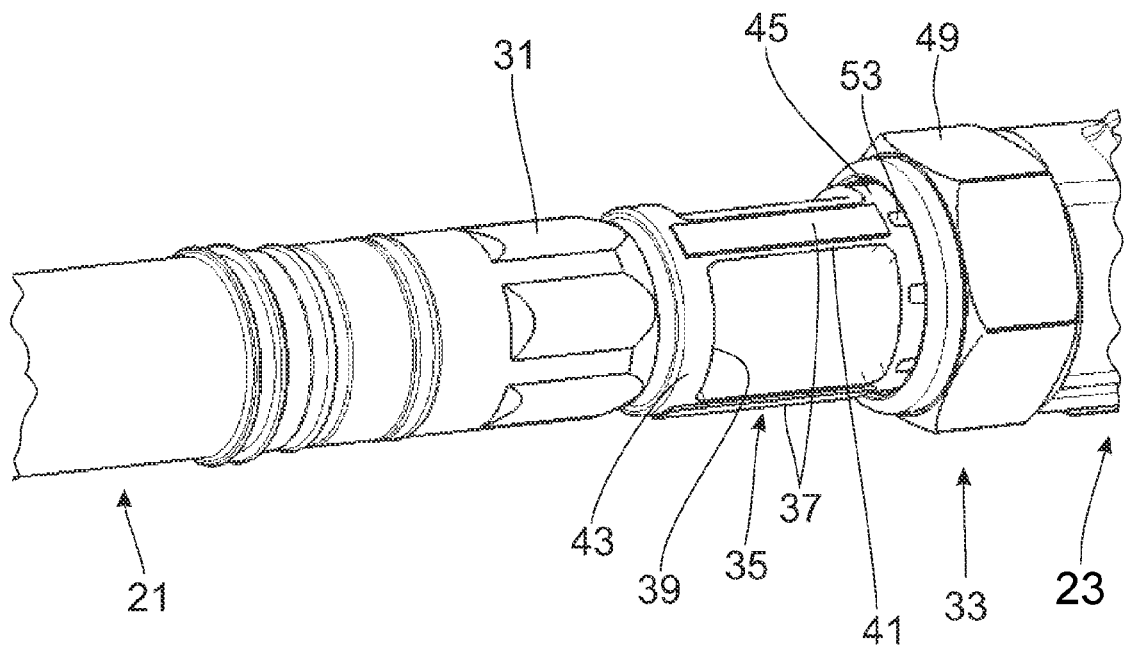
FIGS. 4 and 5: Detailed representations of the track-rod with the sensor system
Figure 5:
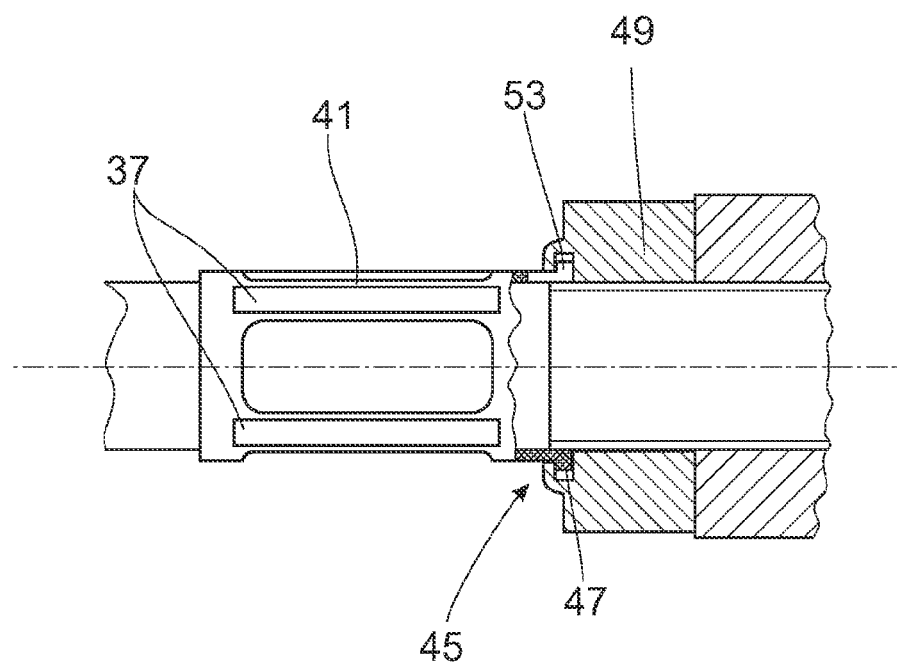

FIGS. 4 and 5 are limited to part of the track-rod in the area of the screw connection 33 to the bearing 23. The track-rod 21 is designed to recognize overloading by virtue of a sensor system 35, which records a nominal condition parameter of the vehicle component or track-rod 21. Specifically, the sensor system is designed as a deformation sensor for the track-rod 21.

The sensor system comprises a number of individual sensors 37, which extend in the longitudinal direction of the track-rod 21. In the circumferential direction the individual sensors are arranged distributed on different planes relative to one another. The individual sensors 37 can relate to various measurement methods. Basically, a length change of an individual sensor results in a changed electrical signal, which is sent to an evaluation device (not shown). If the track-rod 21 is bent, then similarly a deformation takes place, as in the case of torsion, although due to the bearings 23; 25 at its ends, torsion of the track-rod 21 is very unlikely.

As can also be seen from FIG. 4, the individual sensors 37 form a cage 39 or the individual sensors 37 are supported on a cage. The cage 39, with its longitudinal webs 41 and its bearing ring 43 at the end, is preferably made from a plastic so that the individual sensors 37 can already be fixed during the injection-molding process. The inside diameter of the cage 39 is chosen such that it can rotate relative to the track-rod.

The cage is held on one side in the longitudinal direction of the chassis component, i.e. the end toward the bearing 23 is fixed and the other end, in the direction of the steering lever 27, is free. This fixing of the holding point is established for the variant concerned, but can be designed differently for another axle configuration. The one-sided fixing avoids any axial stresses within the sensor system 35.

The cage 39 has an annular attachment section 45 which comprises a flange area 47 or a conical area. In turn, the attachment section 45 is held by fastener 49, in this case a threaded nut of the chassis component which engages with the threaded shaft 29 and thus fixes the cage 39. Consequently the attachment section 45 is positioned at a parting plane 51 of the two-part chassis component, namely between the track-rods 21 or the threaded shaft 29 and the bearing 23 (FIG. 3).

The attachment section is preferably made radially elastic, for example in that the attachment section 45 has a number of cutouts 53 or slits distributed in the circumferential direction.

It can also be provided that the attachment section 45 and the fastener 49 are permanently connected to one another, in that the attachment section 45 is injection-molded onto the fastener 49.

Preferably, the sensor system 35 is arranged at least close to the area of the chassis component or track-rod 21 that has the lowest design strength. The result of that is that even small deformations, which would not yet be measurable in other components or component sections, can now also be detected.

INDEXES

1 Chassis
3 Joint
5 Joint
7 Transverse control arm
9 Wheel carrier
11 Wheel
13 Vibration damper
15 Supporting spring
17 Vehicle body
19 Steering device
21 Chassis component (track-rod)
23 Bearing
25 Bearing
27 Steering lever
29 Threaded shaft
31 Key surface
33 Screw connection
35 Sensor system
37 Individual sensor
39 Cage
41 Longitudinal web
43 Bearing ring
45 Attachment section
47 Flange area
49 Fastener
51 Parting line
53 Cutouts

The invention claimed is:

1. An overload recognition system for a two part bar-type chassis component having a first part that is coupled to a second part by a connection, the overload recognition system comprising:
  a sensor system for detecting a nominal condition parameter of the chassis component,
  the sensor system having a plurality of axially extending individual sensors that are configured to detect a bending of the chassis component or a change in length of the chassis component, and
  the individual sensors forming a cage that radially surrounds the chassis component, the cage having axial first and second ends, the first end is axially held along the chassis component at the connection between the first and the second parts of the chassis component, and the second end is located along the second part of the chassis component,
  the cage, in relation to the chassis component, has an inside diameter such that the cage can rotate relative to the chassis component, and
  the second end of the cage is free of the chassis component.

2. The overload recognition system according to claim 1, wherein the first end of the cage is fixed to the chassis component, and the first end of the cage is axially held, by an annular attachment section, close to an area of the chassis component having a lowest design strength.

3. The overload recognition system according to claim 1, wherein the individual sensors are fixed to the chassis component adjacent a parting line of the chassis component and extend longitudinally along the chassis component, the individual sensors are spaced from one another about a circumference of the chassis component, and the individual sensors detect the bending of the chassis component or the change in length of the chassis component, the first end of the cage fixed to the chassis component.

4. The overload recognition system according to claim 1, wherein the individual sensors are fixed relative to the chassis component.

5. The overload recognition system according to claim 4, wherein the individual sensors are arranged in different planes relative to one another.

6. The overload recognition system according to claim 4, wherein the individual sensors are fixed relative to each other and the first end of the cage is fixed to the chassis component.

7. The overload recognition system according to claim 6, wherein the second end of the cage is movable relative to the chassis component.

8. The overload recognition system according to claim 6, wherein the first end of the cage has an annular attachment section.

9. The overload recognition system according to claim 8, wherein the attachment section is radially elastic and comprises a flange that is radially received within a fastener that is secured to the chassis component at the connection between the first and the second parts of the chassis component.

10. The overload recognition system according to claim 8, wherein the first and the second parts of the chassis component form a parting line, at which the attachment section is located.

11. The overload recognition system according to claim 8, wherein the attachment section is fixedly received by a fastener that is secured to the chassis component at the connection between the first and the second parts of the chassis component.

12. The overload recognition system according to claim 11, wherein the attachment section and the fastener are permanently connected with one another.

13. An overload recognition system for a two part bar-type chassis component which has a first part with a threaded axial end that is connectable to a second part of the chassis component by a threaded connection, and the overload recognition system comprising:
    a sensor system for detecting a nominal condition parameter of the chassis component,
    the sensor system having a plurality of sensors configured to detect bending or changes in length of the chassis component,
    the plurality of sensors are fixed relative to each other and form a cage that radially surrounds and extends axially along the chassis component, a first axial end of the cage has a plurality of cutouts that are spaced from each other in a circumferential direction,
    the first axial end of the cage further has a flange that is received within a radially inner cavity of a threaded fastener which engages with the threaded axial end of the first part of the chassis component such that the first axial end of the cage is fixed to the first part of chassis component at the threaded connection between the first and the second parts of the chassis component.

\* \* \* \* \*